(12) United States Patent
Dengler et al.

(10) Patent No.: US 6,417,916 B1
(45) Date of Patent: Jul. 9, 2002

(54) METHOD AND APPARATUS FOR EXAMINING TEST PIECES (76) Inventors: Stefan Dengler, Mauswiesenweg 10, D-75365 Calw-Stammheim; Bernward Mähner, Daisenbergstrasse 1, D-83607 Holzkirchen, both of (DE)

( * ) Notice: Subject to any disclaimer, the term of this patent is extended or adjusted under 35 U.S.C. 154(b) by 0 days.

(21) Appl. No.: 09/566,727

(22) Filed: May 9, 2000

Related U.S. Application Data (63) Continuation of application No. 09/471,187, filed on Dec. 23, 1999, now abandoned.

(30) Foreign Application Priority Data

Dec. 23, 1998 (DE) .......................... 198 59 725

(51) Int. Cl.[7] .......................... G01L 1/24; G01B 11/16; G01R 31/308
(52) U.S. Cl. .................. 356/35.5; 356/512; 356/513; 324/244.1
(58) Field of Search .................. 324/244.1, 750, 324/96, 753; 356/35.5, 600, 239.7, 601, 512, 513, 514; 359/9, 29; 382/191, 194, 203

(56) References Cited

U.S. PATENT DOCUMENTS 5,703,704 A * 12/1997 Nakagawa et al. .......... 359/9
5,760,888 A * 6/1998 Rottenkolber .............. 356/35.5
6,043,870 A * 3/2000 Chen ........................ 356/35.5

FOREIGN PATENT DOCUMENTS

| DE | 40 13 309 | 10/1991 |
| DE | 41 02 881 | 8/1992 |
| DE | 42 31 578 | 6/1995 |
| DE | 44 46 887 | 7/1996 |
| DE | 195 01 073 | 8/1996 |
| DE | 196 25 830 | 1/1998 |
| FR | 2 502 341 A | 9/1982 |

OTHER PUBLICATIONS

P.A. Fomitchov and S. Krishnaswamy, "A Compact Dual–Purpose Camera for Shearography and Electronic Speckle–Pattern Interferometry," *Meas. Sci. Technol.*8 (1997), pp. 581–583.

* cited by examiner

Primary Examiner—N. Le
Assistant Examiner—Anjan Deb
(74) Attorney, Agent, or Firm—Venable; Gabor J. Kelemen; Jeffrey W. Gluck (57) ABSTRACT A measurement system is used in particular to detect defects in test objects. To that end, the test object is lighted from a lighting unit that includes a plurality of laser diodes. The beam cones of the individual laser diodes generate a common lighting spot on the test object. The object being measured is observed interferometrically, where the interferometer is part of a measurement head. An electronic pattern sensor detects interference patterns generated by the interferometer.

29 Claims, 9 Drawing Sheets

METHOD AND APPARATUS FOR EXAMINING TEST PIECES

CROSS-REFERENCES TO RELATED APPLICATIONS

This application is a continuation of Ser. No. 09/471,187, filed Dec. 23, 1999, abandoned.

Further, this application claims priority rights based on German Patent Application No. 198 59 725.8, filed Dec. 23, 1998, which is incorporated herein by reference in its entirety.

FIELD OF THE INVENTION

The invention relates to an apparatus and a method for examining objects. In particular, the invention relates to an apparatus and a method for examining deformations occurring in objects with diffusely scattering surfaces.

BACKGROUND OF THE INVENTION

Nondestructive tests of objects are of practical value particularly wherever quality tests of workpieces or other kinds of work objects are to be performed. One practical example is examining tires for defects.

To that end, German Patent DE 42 31 578 C2 describes illuminating the surface of a test object with laser diodes. Observation of the test object is done using an interferometer, which generates an interference pattern on a pattern sensor system. A mirror of the interferometer is movably disposed. The interference patterns generated are $2\pi$-modulated; this means that a phase rotation exceeding $2\pi$ can not readily be distinguished from a corresponding phase rotation that is $2\pi$ less. As a result, a pattern of dots or lines can be generated that characterizes the deformation of the surface.

A plurality of laser diodes are used to light the surface of the object, and each laser diode produces one light spot. The light spots border on one another but overlap, if at all, only in peripheral zones. The lighted portions of the surface taken together make up the total surface. The projection quality of the system is limited.

With this as the point of departure, it is the object of the invention to create an apparatus and a method for observing the surfaces of objects with improved picture quality.

SUMMARY OF THE INVENTION

The apparatus of the invention has a measurement head, which generates an interference pattern from light backscattered from the surface of an object. An electronic pattern sensor, which can be integrated with the measurement head, detects the interference pattern and converts it into corresponding electrical signals that can then be further analyzed.

The image field detected by the measurement head is illuminated by a lighting unit, which has a plurality of laser diodes. The laser diodes are disposed such that they form a common light spot. This spot is preferably uniformly lighted, so that within the light spot only slight differences in brightness may be encountered. This is a result of a relatively major overlap of the beams emerging from the individual laser diodes. The common light spot is not subdivided into individual light spots. A plurality of laser diodes illuminate the entire area of the light spot in such a way that radiation backscattered from each point is incoherent. The laser diodes are arranged such that the backscattered total radiation of each portion of the total area observed when the laser diodes are all in operation is greater than when only one laser diode is in operation.

The overlap zones of the regions illuminated by the laser diodes are preferably larger than the nonoverlapping zones. This makes it possible to achieve a uniform distribution of light. Furthermore, it is preferable not to permit any zone that is lighted by only one laser diode. To ensure that no portion of the area is lighted by only one light source (laser diode), laser diodes can also be combined into groups and aimed in groups of two or more laser diodes at a selected portion of the area.

By means of the uniform illumination of the surface of the object to be examined, enhanced picture quality is achieved despite the lack of coherence of the individual components of the light striking the surface. In the interference pattern generated, the desired deformations are readily apparent both in the middle of the image and at the edges.

The beams of the laser diodes can overlap so markedly that more than half the area of the light spot receives light from two laser diodes. There may exist extended regions that are lighted with approximately the same intensity from the light of a plurality of laser diodes. The light spots of individual laser diodes can, as a result, occupy virtually the entire field to be illuminated. In this way, narrow edge zones in which the light spots adjoin one another, and where uneven light distribution could occur, are avoided.

There can also be a plurality of regions that are struck by the light from more than two laser diodes. The orientation is expediently arranged in most cases to provide a uniform distribution of brightness. It is also possible to have virtually the entire area of the light spot illuminated by more than two diodes or by other numbers of diodes.

From independent light sources, not coherent with one another but oriented virtually in the same direction, a plurality of coincidence speckle fields can be generated and projected simultaneously onto a pattern sensor. The resultant superimposed speckle field is detected and used to calculate the deformation of the object.

It is possible to have the laser diodes of the entire group shine simultaneously, preferably in continuous operation. In a modified embodiment, the laser diodes can be operated in pulsating fashion. This makes a higher light yield possible at the moment a picture is taken; as a result, either the object field under observation can be enlarged, or the lighting power or the exposure time can be reduced.

It is advantageous if the individual light sources are not coherent with one another, but have light wavelengths differing only slightly from one another. Furthermore, the angles of incidence (the angles at which the beams of light strike the object) of the individual light sources should not differ excessively.

It is also possible to use somewhat more-different light wavelengths, say, $\lambda_1$ and $\lambda_2$. If two groups of light sources are used, the resulting sensitivity can then be calculated as $$\lambda_{res}=(\lambda_1 * \lambda_2)/(\lambda_1+\lambda_2).$$

Each wavelength component should be present with, as much as possible, the same intensity.

Alternatively, it is possible to trigger the laser diodes or to provide them with a shutter device, for instance, in such a way that the light beams of the laser diodes strike the surface of the object in a chronologically staggered fashion. The resulting individual interferograms can be superimposed at the pattern sensor and added together (integrated), or depending on the hardware, they can be detected individually and then combined with one another in a computer. As in the case of continuous lighting, the overall result is a uniformly illuminated field. The laser diodes can be disposed such that they are either stationary or in motion.

The pattern sensor is preferably connected to an image analysis device, which on the basis of a plurality of detected interference patterns determines a deformation of the surface of the object. This is expedient especially in cases in which the structure or form of the undeformed surface of the object is of no interest. Such measurements are expedient, for example, in workpiece testing or materials testing. For instance, they can be employed to detect defects in tires. The surface of the tire to be examined is detected at two ambient pressures different from one another. The resultant deformations are rendered visible.

The interferometer can function without a direct interference beam. This is possible if the beam backscattered from the object is split into two fractional beams, one of which is subjected to a phase displacement. The phase displacement can preferably be controlled or monitored.

To that end, it is advantageous to employ a device for phase displacement, preferably, a mirror that is adjusted by a piezoelectric actuator. It is possible to use a Michelson interferometer as the interferometer; however, an especially advantageous embodiment uses an arrangement in which the object beam, received at the measurement head, is split into two fractional beams that reach the pattern sensor over different paths and reunite only there. This has the advantage of avoiding the type of light losses that occur in the Michelson interferometer when the fractional beams are reunited in the beam splitter.

The pattern sensor is connected to an image analysis device that preferably has a computation unit. The computation unit, preferably a suitably powerful computer, executes a program that performs image processing. For instance, from a plurality of pictures taken of the stationary object with mutually shifted phase relationships, a phase image is calculated. The phase relationships of individual pixels are, as a rule, stochastically distributed and do not provide any direct conclusion that can be drawn about the object. If the surface of the object is deformed, however, or if it is displaced by a slight distance toward or away from the measurement head, and if in this state a phase image is obtained, for instance, by linking together a plurality of interference patterns altered by phase displacement, then a phase difference image can be derived from the two phase images. The phase difference image provides information on local displacements or deformations and can be displayed. To that end, the applicable phase difference angle of each pixel is assigned a gray value that is displayed at the appropriate point on a playback device. For example, the display value of black may be assigned to a phase difference angle of 0, and the gray value of white may be assigned to the phase difference angle of $2\pi$.

In an advantageous feature of the method and the associated apparatus, the phase difference angles, before they are displayed, are $2\pi/n$-modulated. To that end, the differential angles of the phase difference image are subjected, on a pixel-by-pixel basis, to a modulo $2\pi/n$ division. This means that the phase difference angle is divided by $2\pi/n$, and the remainder is the result. This result is multiplied by the factor n and yields the $2\pi/n$-modulated value, which in the range from 0 to $2\pi/n$ is displayed with gray values ranging between black and white. If desired, a color display may also be selected. The factor n is preferably an integer greater than 1. This amplifies any deformations of the object that are present and visible in the phase difference image and thus makes defects in the object more clearly apparent.

Alternatively, it is possible to use the phase difference or the $2\pi/n$-modulated values of the phase differences to modulate a sine function and to have the resulting value displayed. This produces a stripe pattern that characterizes the object deformation. The higher the value of n selected, the higher the resolution; that is, the more stripes appear in a particular object deformation. It is expedient if the user can select the factor n by suitable input means. The factor can also be switched over, for instance after one picture is taken, so that the same test run, or, in other words, the same object deformation, can be represented using different modulations.

The method is suitable for testing objects with diffusely scattering surfaces and produces a picture-type illustration of phase difference angles. This allows the user to easily recognize structural defects in a measured object. This method can be employed for arbitrary test objects or sizes of defects and requires a relatively low computational effort, so that display of the results virtually in real time is assured.

In another advantageous feature of the invention, the value to be displayed is scaled in such a way that the full gray value range that the image processing system is capable of displaying is utilized. To make defects more visible, the gray value or color value corresponding to an angle of magnitude zero can be interactively set by the user.

The $2\pi/n$-modulated phase difference image can also be obtained directly from the phase-displaced intensity patterns of a first imaging series for a first object state and a second phase-displaced imaging series for a second object state. To this end, the equations for the $2\pi/n$-modulation are inserted into the equations for generating the phase difference images from the intensity patterns.

In an advantageous embodiment, all the points in the light spot that are covered by the camera or other imaging device are lighted by at least two laser diodes. As a result, correct measurement results can be obtained even if one laser diode has failed. The light is then incoherent in the entire range covered by the camera.

Further details of advantageous features of the invention are the subject of the drawings, the description and the claims.

BRIEF DESCRIPTION OF THE DRAWINGS

Exemplary embodiments of the subject of the invention are illustrated in the drawings, in which are shown.

DETAILED DESCRIPTION OF THE INVENTION

Figure 1:
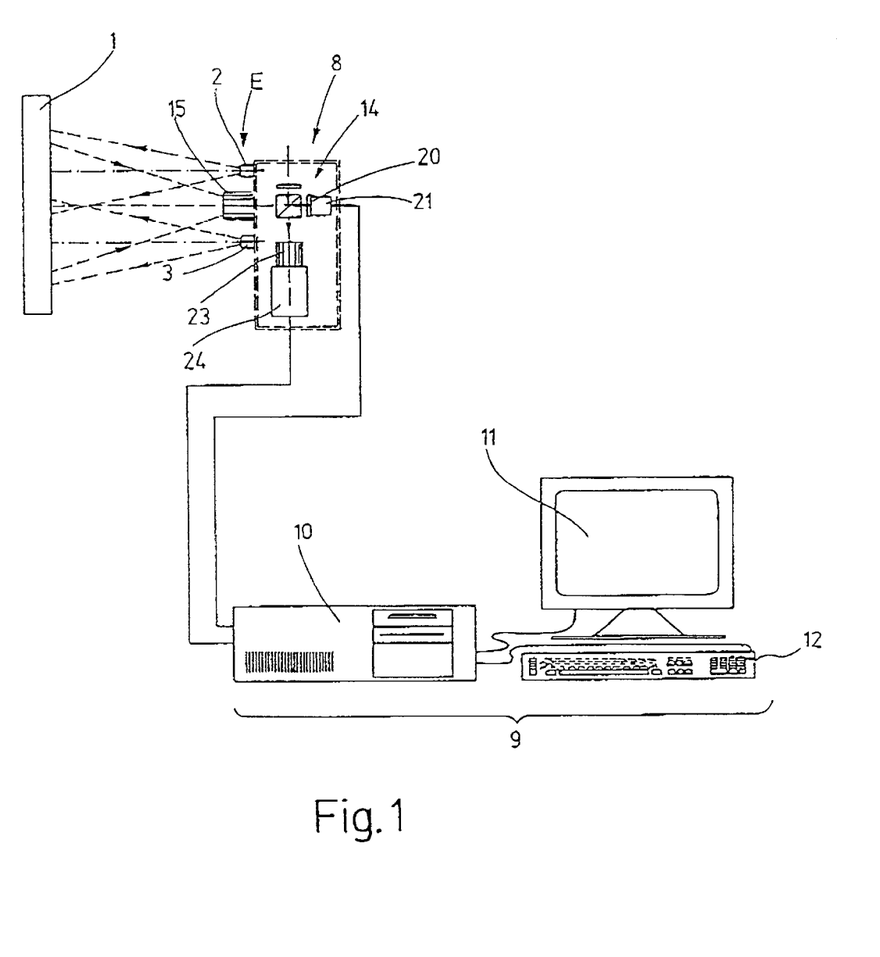
FIG. 1, an apparatus according to the invention for ascertaining deformations in the surface of an object, shown schematically.
Figure 2:
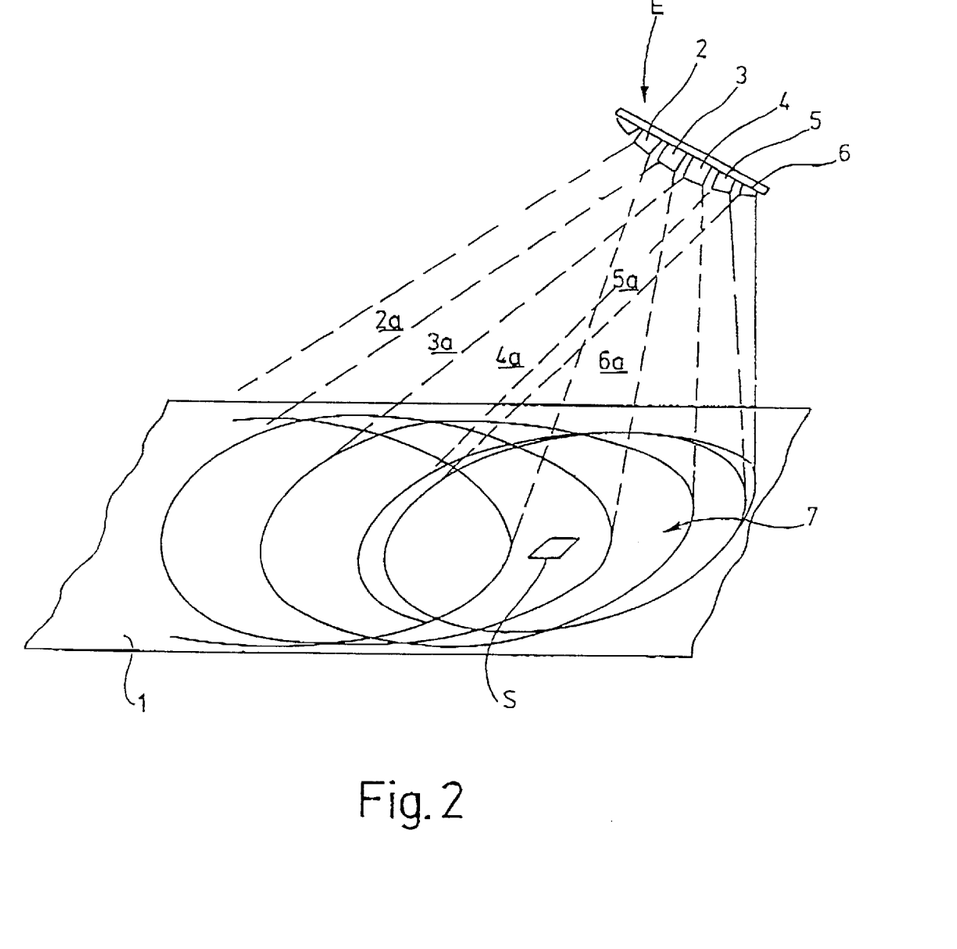
FIG. 2, a lighting unit and a surface of an object lighted by it for interferometric evaluation of deformations of the surface, in a schematic basic view.

In FIG. 1, a measuring system for measuring deformation in a test object 1 by shearing interferometry is shown. A lighting unit E having a plurality of laser diodes 2, 3 is used to light test object 1, which can, for instance, be a tire, other kinds of rubber parts, or some other object. In FIG. 2, the lighting of the surface of the test object 1 is shown in further detail. The schematically shown lighting unit E has, in addition to the laser diodes 2, 3, further laser diodes 4, 5, 6, and each of these independently generates one light cone 2a, 3a, 4a, 5a, 6a. The light cones 2a, . . . , 6a converge so that they overlap in multiple places on the surface of test object 1. The overall result is a light spot 7 that is largely uniformly lighted. An arbitrarily selected point S is lighted by a plurality of light cones 4a, 5a, 6a, which can have the same or different opening angles. The light of the applicable laser diode 4, 5, 6 has substantially the same wavelength, but the light of a given laser diode is not coherent relative to the others. The same is true for the backscattered light.

Returning to FIG. 1, for observing the surface of the test object 1, a measurement head 8 is used, which is connected to an image analysis unit 9. Image analysis unit 9 includes a computer 10 and a monitor 11 as well as an input device, for example, keyboard 12.

The measurement head 8 includes an interferometer 14, which, via a lens element 15, receives light radiation backscattered from the surface of the test object 1.

Figure 3:
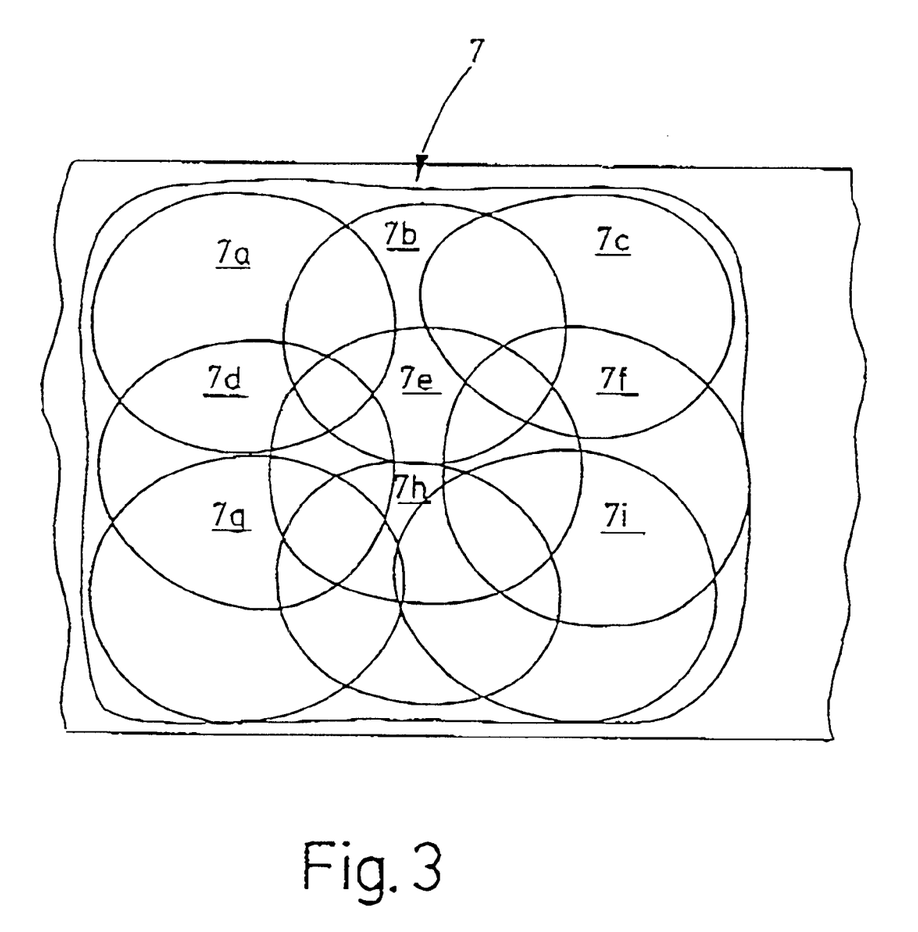
FIG. 3, the surface of an object with a light spot striking it from a lighting unit of FIG. 2.

FIG. 3 shows a light spot 7; it is formed of a plurality of partial light spots 7a, 7b, 7c, 7d, 7f, 7g, 7h, 7i, which all overlap one another markedly. Some parts of the light spot 7 are lighted by up to four different laser diodes. The fanning out of the beam pattern can also be selected to be greater, so that each laser diode illuminates virtually the entire light spot 7. The illumination can be done from different angles in space, resulting in a uniform distribution of scattered light in space and uniform illumination of the spot.

Figure 4:
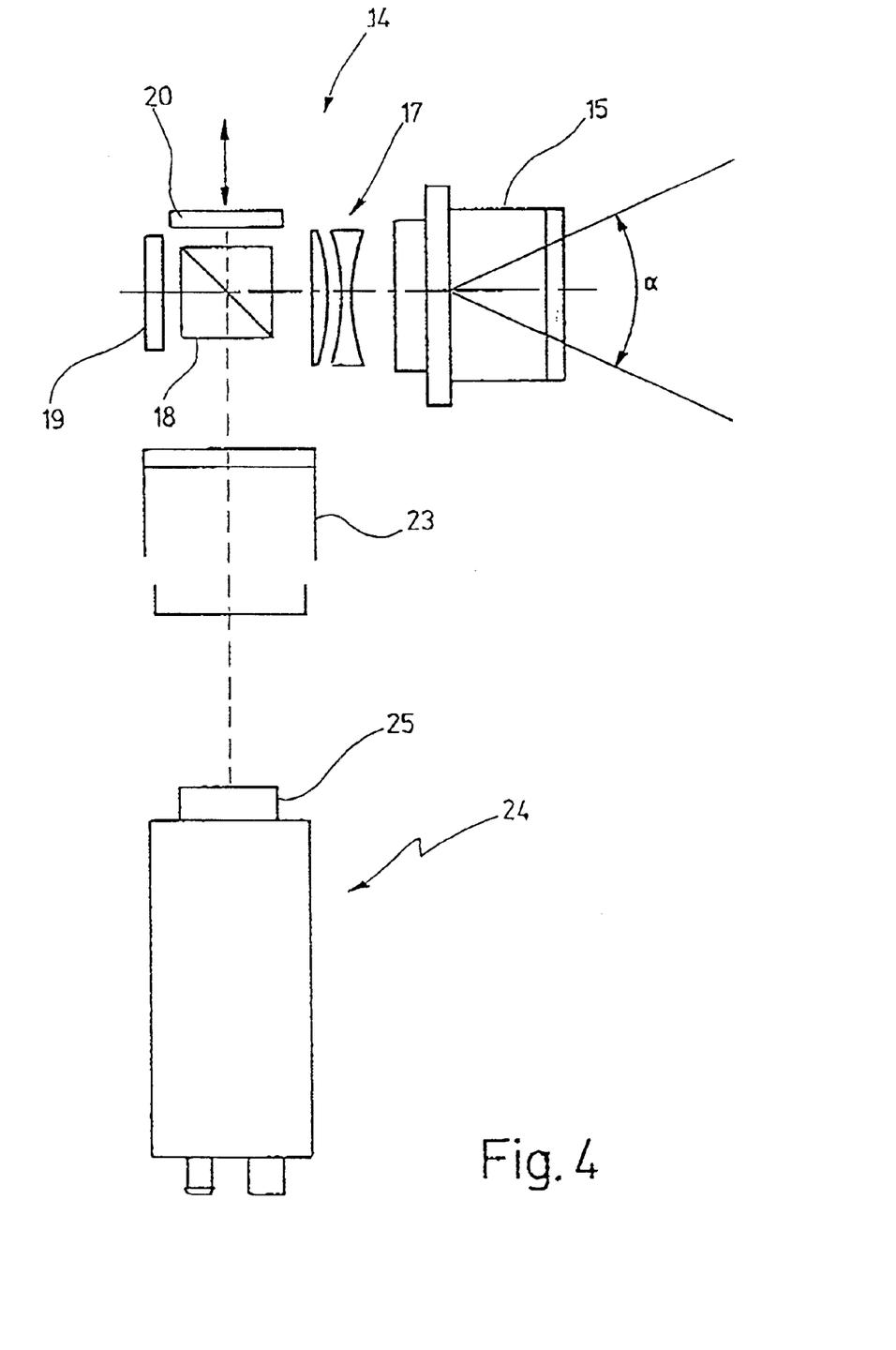
FIG. 4, a measurement head of the apparatus of FIG. 1, shown schematically.

The interferometer 14 shown in FIG. 4 is embodied as a Michelson interferometer. The lens element 15 has an opening angle α, through which the surface of the object is imaged. The arrangement is preferably selected such that the light spot 7 relatively precisely fills up the field of view of the lens element 15. If needed, however, deviations from this can also be present. The lens element 15 preferably includes a shutter and, downstream of it, a lens system 17, so that it can form a beam from the light backscattered from the surface of the object. This beam is carried to a beam splitter 18, which is disposed in the beam path of the lens system 17. The beam splitter 18 splits the arriving beam of light into two fractional beams, which strike mirrors 19, 20, which are virtually at a right angle to one another. The mirrors are arranged so as to reflect the applicable fractional beam substantially back into itself, but a certain tilting is allowable or may be necessary to produce shearing projections.

The mirror 19 is supported in stationary fashion, while the mirror 20 is adjustable in and counter to the beam direction by a piezoelectric drive, as shown, for instance, in FIG. 1. The piezoelectric actuator is controlled by the computer 10 and arranged so as to adjust the mirror in λ/4 increments, where λ refers to the light wavelength.

The beam splitter 18 reunites the fractional beams reflected from the mirrors 19, 20 and delivers them via a projection lens element 23 to a camera 24. The camera 24 includes a CCD matrix 25 as a pattern sensor as well as the appropriate electronic building blocks for triggering it. The camera 24 is connected to the computer 10.

The measuring system described thus far functions as follows:

To determine defects in a test object 1, the object 1 is placed in front of the measurement head 8 and is illuminated with the laser diodes 2, 3, 4, 5, 6. The laser diodes 2, 3, 4, 5, 6 can be operated in a continuous mode; that is, they can shine continuously and simultaneously. This creates the light spot 7 on the object 1, which light spot strikes the region to be examined for defects. Without perceptibly moving the object 1 in any way, a plurality of images of the surface of the test object are now taken. To that end, given suitable positioning of the mirrors 19, 20, a first image is first taken and stored in memory. The image detected by the pattern sensor 25 is an interference pattern of the surface of the object, which includes stochastically distributed bright, dark and gray regions, known as "speckles". Once this image has been taken, the computer triggers the mirror 20 in such a way that it is displaced by a known amount. This brings about a defined phase displacement between the two fractional beams of the mirrors 19 and 20. The speckled pattern changes, with individual speckles assuming an altered brightness. The speckles themselves, however, remain in the same place.

Once this image has been taken, a further adjustment of the mirror 20 is done, so that a third image can be taken. Once the third image has been taken, a fourth image is taken after yet another adjustment of the mirror 20 by a known phase amount. From the four different speckle patterns, the computer 10 calculates the phase angle that is valid for each speckle or each pixel.

Figure 6:
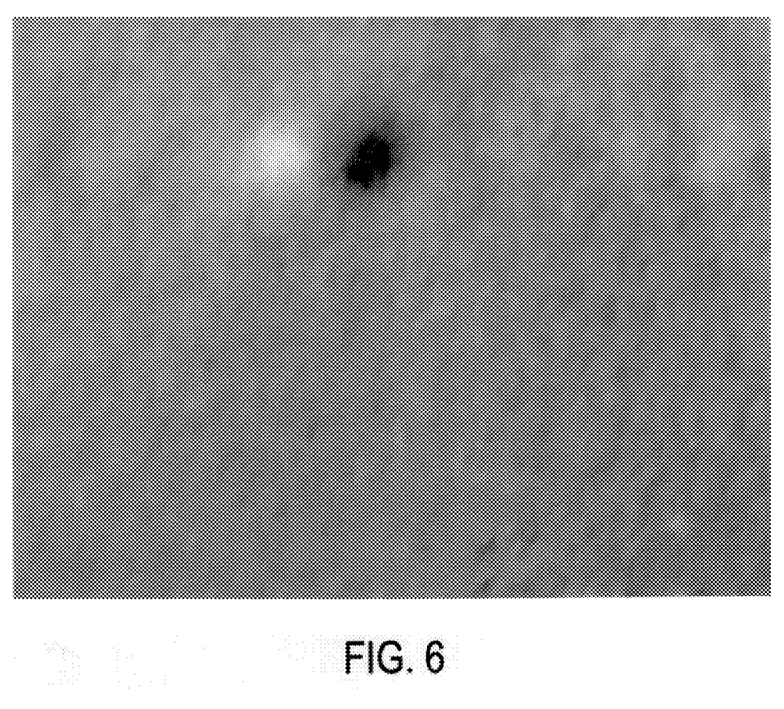
FIG. 6, a $2\pi/n$-modulated image of an object surface.

Once the first phase difference image has been created in this way, the test object 1 is acted upon by a testing force, for instance. In the case of tires, this might be done by changing the ambient pressure. This causes characteristic deformations on the surface of test object 1, which in particular are more pronounced at defects than in the surrounding areas. If test object 1 is deformed, then once again a plurality of speckle patterns are taken, phase displaced by adjustment of mirror 20, and from these images the altered phase angles can then be calculated pixel by pixel. The result is a second phase angle image. To determine the surface deformation, a phase difference image is now generated from the two phase images obtained. The phase angle difference between the deformed and undeformed states is determined for each pixel. Once the phase difference image has been obtained in this way, it can be displayed on the monitor 11. FIG. 6 shows an image of defects that was generated by this method. Although one defect, which appears black, is still fairly visible, the defect beside it to the left is relatively hard to see.

The defects may be enhanced if the computer 10 reprocesses the phase difference images. In the reprocessing, a 2π/n-modulated phase difference image is generated for the phase difference images Δϕ(x,y). To that end, for each pixel (x,y), the following equation is executed:

$$\phi_{dif}(x,y)=n\cdot(\Delta\phi(x,y))\text{MOD}(2\pi/n))\cdot S, \text{ or:}$$

$$\phi_{dif}(x,y)=n\cdot((\phi_2(x,y)-\phi_1(x,y))\text{MOD}(2\pi/n))\cdot S,$$

where

Δϕ(x,y)=phase difference angle at the point (x,y);

$\phi_1$(x,y)=phase difference angle at the point (x,y) in state 1;

$\phi_2$(x,y)=phase difference angle at the point (x,y) in state 2;

$\phi_{dif}$(x,y)=phase difference angle with 2π/n modulation at the point (x,y);

n is an integer greater than or equal to 1;

S is a conversion factor for converting the phase difference angle into a gray value; and MOD represents the modulo operator.

Figure 5:
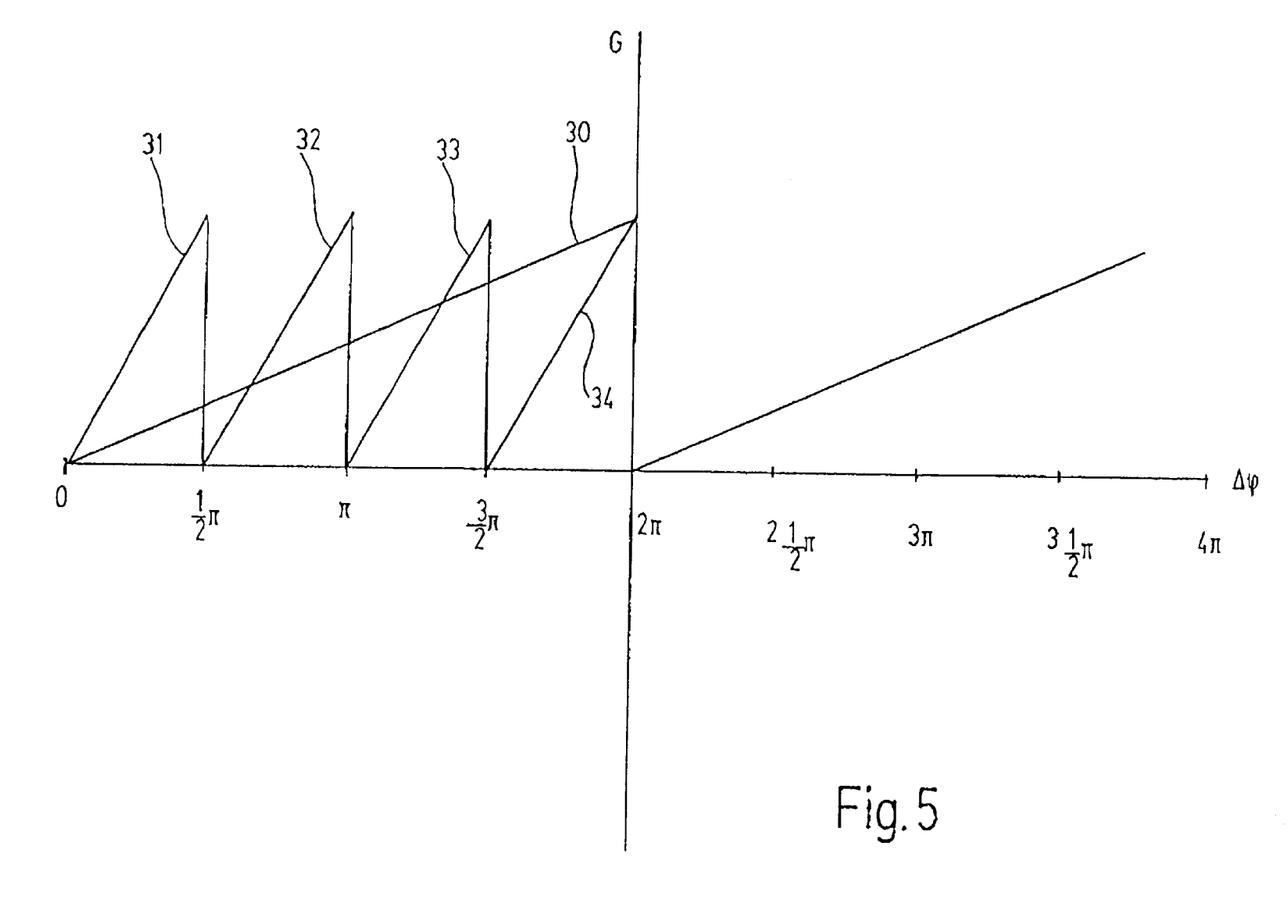
FIG. 5, gray values G as a function of phase difference angles $\Delta\phi$ for different modulations.
Figure 7:
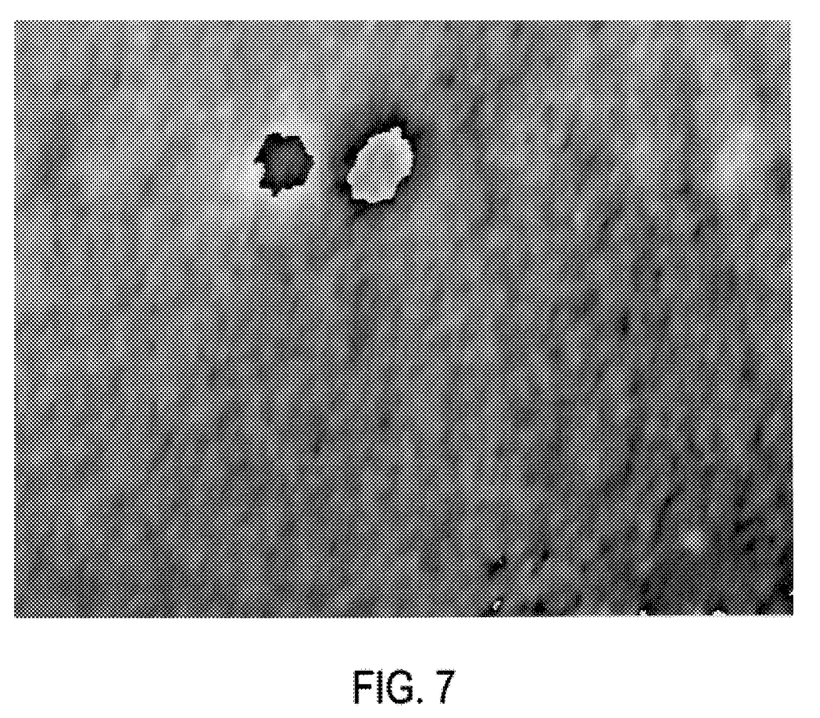
FIG. 7, a $\pi$-modulated defect pattern on the same object surface.

This operation is illustrated in FIG. 5. The graph shows the assignment of a gray value G to a phase difference angle Δϕ at a selected point x,y. Without reprocessing, phase difference angle values between 0 and 2π are assigned gray values corresponding to a straight line 30. Upon reprocessing, for instance with n=4, the phase difference angles Δϕ are projected onto the correspondingly steeper straight lines 31, 32, 33, 34. This is done by projecting the various difference angles Δϕ into the region occupied by the straight lines 31. To that end, the existing phase difference angle Δϕ, for example, say, 3π/4, is divided by 2π/4. This example gives the quotient 1, and the remainder is π/4, which represents the result of 3π/4 MOD 2π/4. The remainder from the division is then multiplied by n, with n being the factor that characterizes the increased upward slope of the straight line 31 compared to the straight line 30. In this illustration, the same gray value is assigned to the difference angles π/4, 3π/4, 5/4 π and 7/4 π. The corresponding view on the monitor screen is shown in FIG. 7. The two defects can be seen markedly enhanced as bright and dark spots. This allows reliable, precise representation of defects and avoids the risk that structural errors will be overlooked in inspecting the object because they appear washed out.

It is also possible to insert the phase difference angle Δϕ or the 2π/n-modulated difference angle Δϕ as an argument of a sine function, in order to carry out a sine transformation. Once again, this must be done point by point. The transformation is as follows:

ϕ(x,y)→sin(ϕ(x,y)).

Figure 8:
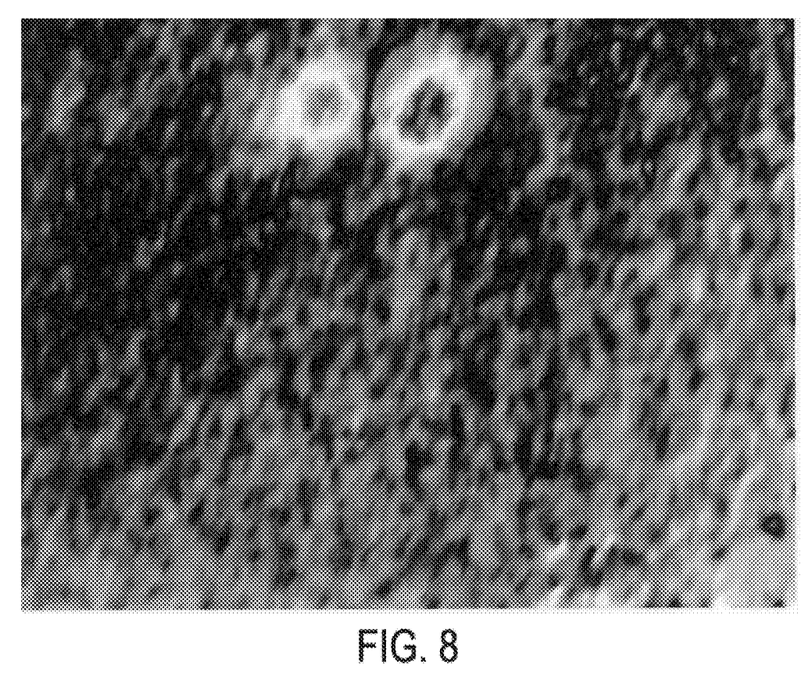
FIG. 8, a sine-transformed, modulated phase difference image, formed from the defect pattern of FIG. 6.

The amplitude of the interference lines is normalized; that is, the amplitude of the sine modulation is constant everywhere in the image, regardless of its location. The resultant image, especially an image of defects (FIG. 8), is readily readable. The number of interference lines becomes greater as the value of n becomes greater.

The image analysis device 9, that is, the program running on the computer 10, can be designed to permit a choice of modulation by inputting the factor n, for instance. The program can also be designed to permit a switchover between playback of the phase difference angles (with and without modulation) and the playback of a sine-transformed image.

Figure 9:
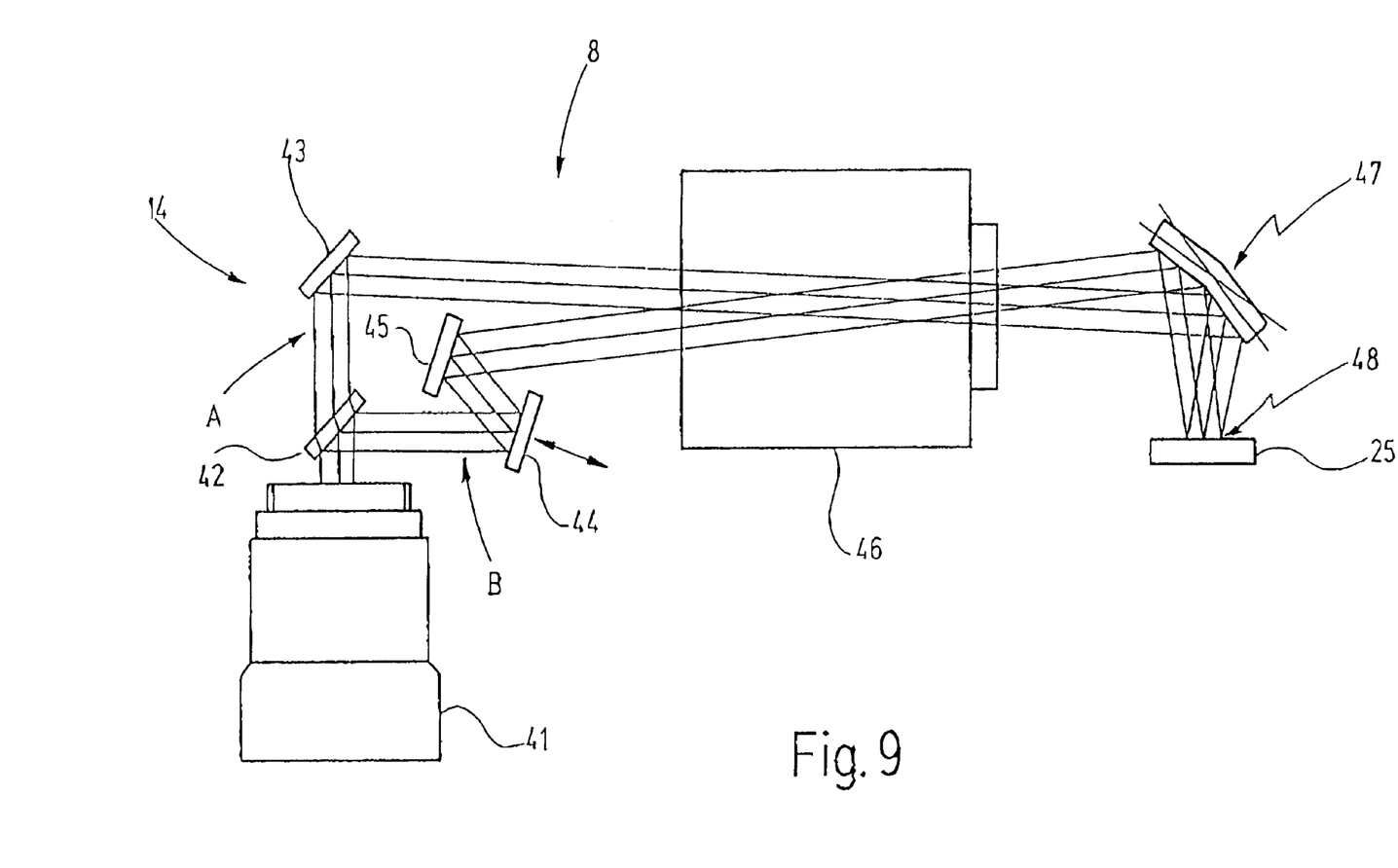
FIG. 9, a further embodiment of the apparatus according to the invention for ascertaining deformations on the surface of an object, shown schematically.

In FIG. 1, a measurement head 8 with a Michelson interferometer is used. In a departure from this, a measurement head 8 with an interferometer 14 as shown in FIG. 9 can be employed. In this interferometer, a beam of light is split into fractional beams A, B, which are not united into an interference pattern until they reach the CCD matrix 25. This has the advantage of a markedly stronger-light projection. The interferometer 14 has an imaging lens element 41, which sends a beam of light to beam splitter 42; this is where the fractional beams A and B are created. The fractional beam A is directed to a tilting mirror 43 and is deflected approximately at a right angle. The fractional beam B first strikes a mirror 44, which is supported displaceably by a drive, for instance a piezoelectric drive, and is reflected at an acute angle. It then strikes a further mirror 45, disposed approximately parallel to the mirror 44, so that the fractional beam B from the mirror 45 extends at an acute angle to that portion of the fractional beam A that leads away from the mirror 43. Both fractional beams are passed through a projection lens system 46 and strike a biaxial mirror 47. The biaxial mirror 47, embodied as an angled mirror, now causes both fractional beams A, B to strike one and the same point 48 of the pattern sensor 25. The pattern created here by interference of the fractional beams A and B is detected by the pattern sensor 25 and is then transmitted to the computer 10. The computer 10 also controls the drive of the displaceable mirror 44, in order to bring about a phase modulation, which facilitates the taking of phase-displaced images.

A measuring system is used, in particular, to detect defects in objects under test. The test object 1 is, to that end, lighted uniformly from a lighting unit E that includes a plurality of laser diodes 2, 3, 4, 5, 6. The beam cones of the individual lasers overlap greatly, resulting in homogenous illumination even at wide imaging angles and under varying projection conditions resulting from different object sizes and distances. The object 1 being tested is observed by interferometry. From individual images, phase difference images are obtained. The phase difference images may be 2π/n-modulated, as a result of which phase discontinuities that produce especially good contrast occur particularly in regions of defects.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. An apparatus for ascertaining deformations on the surface of an object being tested, comprising:
   a measurement head, which comprises an interferometer for generating an interference pattern,
   an electronic pattern sensor that detects the interference pattern and is disposed in the beam path of the interferometer, and
   a lighting unit, comprising a group of laser diodes arranged to generate a common light spot on the object being tested wherein said group of laser diodes comprises a group of mutually non-coherent laser diodes.

2. The apparatus of claim 1, wherein a plurality of laser diodes of the group have mutually overlapping beam cones.

3. The apparatus of claim 1, wherein the light spot has at least one region lighted by the light of more than two laser diodes.

4. The apparatus of claim 1, further comprising an image analysis device connected to the pattern sensor, the image analysis device determining a deformation of the surface of the object based on a plurality of detected interference patterns.

5. The apparatus of claim 4, wherein the image analysis device comprises a computation unit that calculates one phase pattern from a plurality of images taken from the object in different phase relationships.

6. The apparatus of claim 5, wherein the image analysis device further comprises a display device connected to the computation unit, the display device being used to display said phase pattern.

7. The apparatus of claim 1, wherein the interferometer comprises a device for phase displacement of two partial beams relative to one another.

8. The apparatus of claim 1, wherein the interferometer comprises a Michelson interferometer.

9. The apparatus of claim 1, wherein the interferometer comprises a beam splitter that splits light coming from the surface of the object into two split beams, the split beams traveling along different paths to the pattern sensor and striking the pattern sensor to generate an interference pattern.

10. The apparatus of claim 1 wherein all the points in the light spot that are covered by the camera or other image device are lighted by at least two laser diodes.

11. A method of ascertaining deformations of a surface of an object being tested, comprising the steps of:
    lighting the surface of the object using a group of laser diodes whose light is projected onto a common spot on the object wherein said group of laser diodes are mutually non-coherent; and
    detecting light backscattered from the object and passing it through an interferometer.

12. The method of claim 11, wherein the common spot has at least one region lighted by the light from more than two laser diodes.

13. The method of claim 11, wherein the step of lighting comprises the step of simultaneously lighting up the laser diodes of the group.

14. The method of claim 13, wherein the step of simultaneously lighting up laser diodes of the group comprises the step of lighting up the laser diodes of the group in continuous operation.

15. The method of claim 11, wherein the step of lighting comprises the step of operating the laser diodes of the group in pulsating fashion.

16. The method of claim 11, further comprising the steps of:
    taking a plurality of images of the surface of the object, with phase displacements relative to one another;
    generating, based on the plurality of images, at least two phase patterns; and
    generating a phase difference image by subtracting from one another, on a pixel-by-pixel basis, phase angles associated with a first phase pattern and those associated with a second phase pattern.

17. The method of claim 16, wherein each of the phase patterns is associated with a different state of the object.

18. The method of claim 16, further comprising the steps of:
    taking the value of each point of the phase difference image modulo-$2\pi/n$ and multiplying it by n, where n is an integer grater than one, thereby obtaining $2\pi/n$-modulated values.

19. The method of claim 18, further comprising the step of inserting each $2\pi/n$-modulated value pixel by pixel as an argument into a sine function, thereby obtaining sine-modulated values.

20. The method of claim 19, further comprising the step of displaying said sine-modulated values on a display device.

21. The method of claim 18, further comprising the step of displaying said $2\pi/n$-modulated values on a display device.

22. The method of claim 16, further comprising the step of obtaining a $2\pi/n$-modulated phase difference image directly from intensity patterns detected with phase offset.

23. The method of claim 22, further comprising the step of inserting each $2\pi/n$-modulated value of the $2\pi/n$-modulated phase difference image pixel by pixel as an argument into a sine function, thereby obtaining sine-modulated values.

24. The method of claim 23, further comprising the step of displaying said sine-modulated values on a display device.

25. The method of claim 22, further comprising the step of displaying said $2\pi/n$-modulated values on a display device.

26. The method of claim 16, further comprising the step of inserting pixel by pixel each phase difference of said phase difference image as an argument into a sine function, thereby obtaining sine-modulated values.

27. The method of claim 26, further comprising the step of displaying said sine-modulated values on a display device.

28. The method of claim 16, further comprising the step of displaying said phase difference image on a display device.

29. The method of claim 15, wherein all the points in the light spot that are covered by the camera or other image device are lighted by at least two laser diodes.

\* \* \* \* \*